United States Patent [19]

Baum

[11] Patent Number: 5,533,723
[45] Date of Patent: Jul. 9, 1996

[54] COMPOSITE BASEBALL BAT WITH CAVITIED CORE

[75] Inventor: Charles S. Baum, Traverse City, Mich.

[73] Assignee: The Baum Research & Development Company, Traverse City, Mich.

[21] Appl. No.: 504,567

[22] Filed: Jul. 20, 1995

Related U.S. Application Data

[60] Division of Ser. No. 262,432, Jun. 20, 1994, Pat. No. 5,458,330, which is a continuation-in-part of Ser. No. 137,694, Oct. 15, 1993, Pat. No. 5,460,369, which is a continuation of Ser. No. 883,263, May 14, 1992, abandoned, which is a continuation-in-part of Ser. No. 518,782, May 4, 1990, Pat. No. 5,114,144.

[51] Int. Cl.⁶ .................................................. A63B 59/06
[52] U.S. Cl. ........................................................... 273/72 R
[58] Field of Search ............................. 273/72, 67, 26 B, 273/73 J, DIG. 23, DIG. 8, 82 R, 80.3; 428/106, 285, 35.6; 440/101; 156/245

[56] References Cited

U.S. PATENT DOCUMENTS 5,458,330  10/1995  Baum ..................................... 273/72 R Primary Examiner—Mark S. Graham
Attorney, Agent, or Firm—Gifford, Krass, Groh, Sprinkle, Patmore, Anderson & Citkowski

[57] ABSTRACT

A baseball bat or the like comprises a tube formed with an outer layer of wood-like veneer covering a layer of fiber reinforced resin, with the tube layers being impregnated with and bonded to one another with a cured resin. The ends of the tube are closed off with caps adhered to the tube and preferably molded in place. The tube preferably has a foam or aluminum core including a central cavity, said core having sufficient resiliency to allow the tube to resiliently deform during impact with a baseball. The product is formed by molding over a form which may constitute the cavitied foam core or, alternatively, a forming mandrel which is removed after the resin is cured. The cavity may be filled with a material which is less dense than the core.

15 Claims, 5 Drawing Sheets

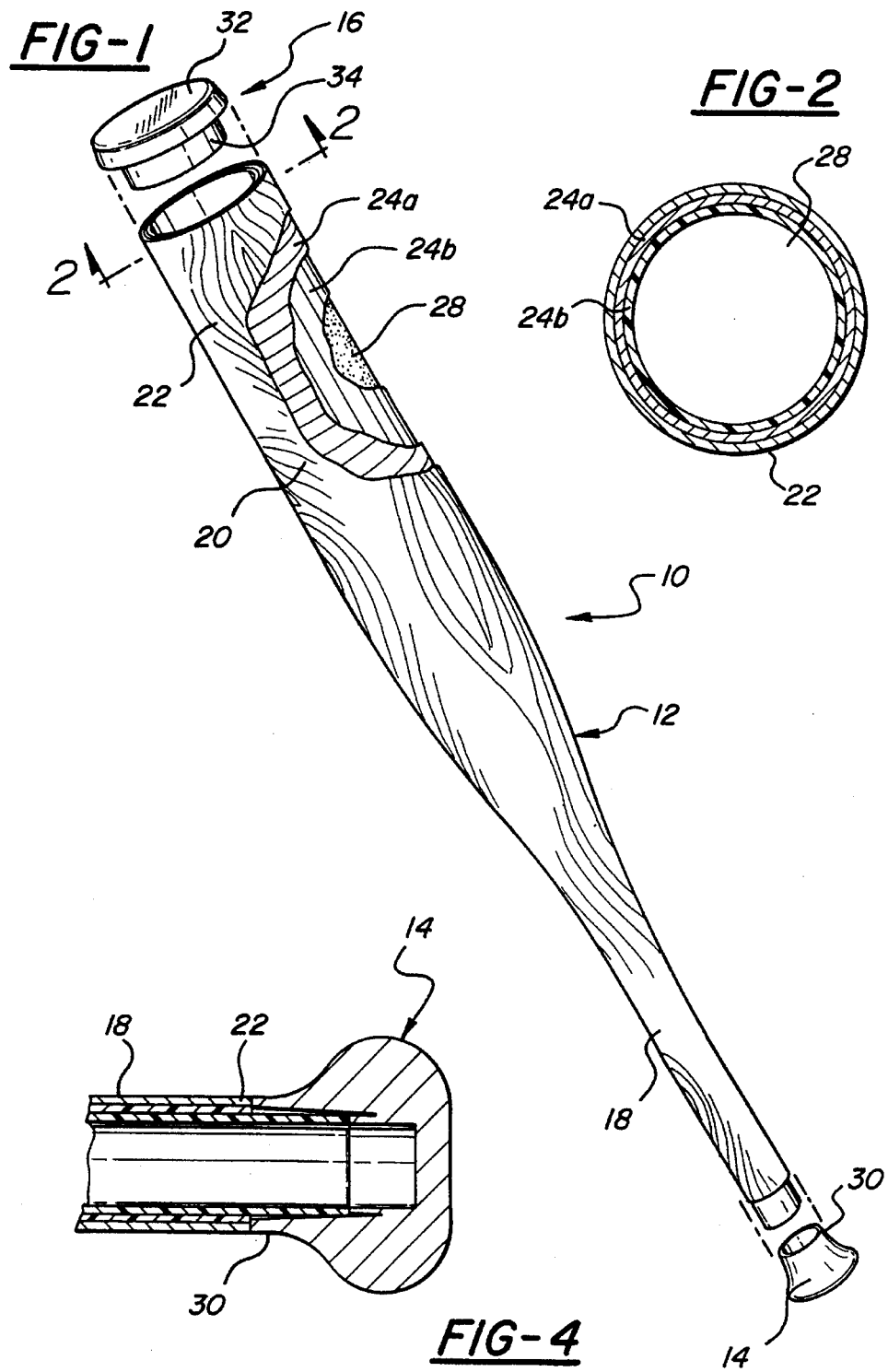

FIG-3
FIG-5
FIG-6
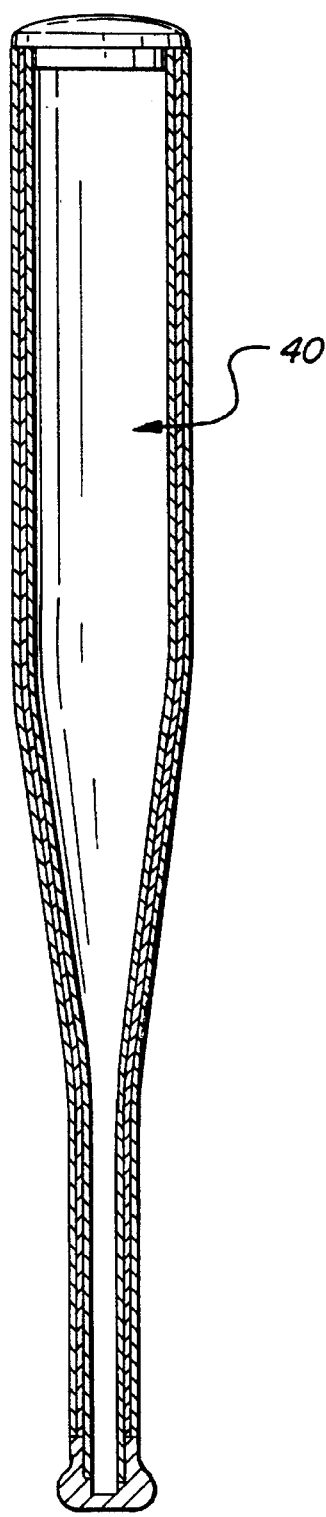
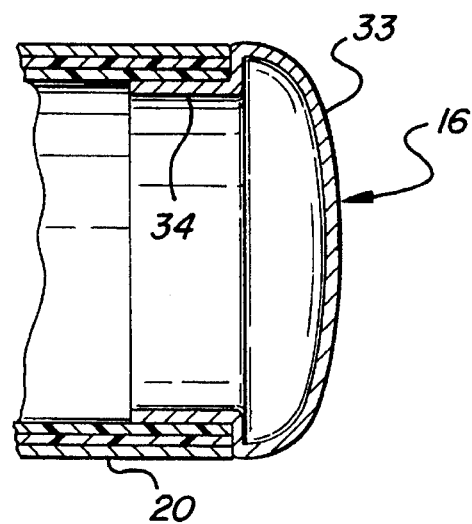
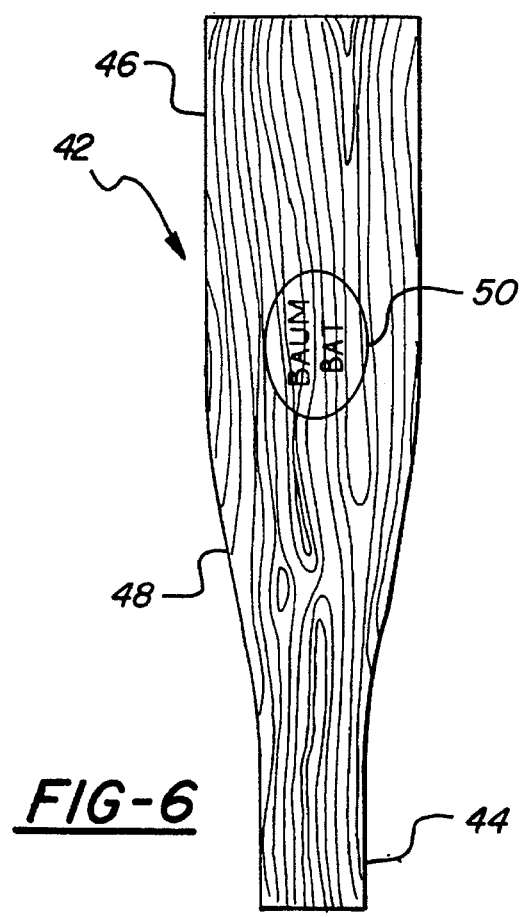

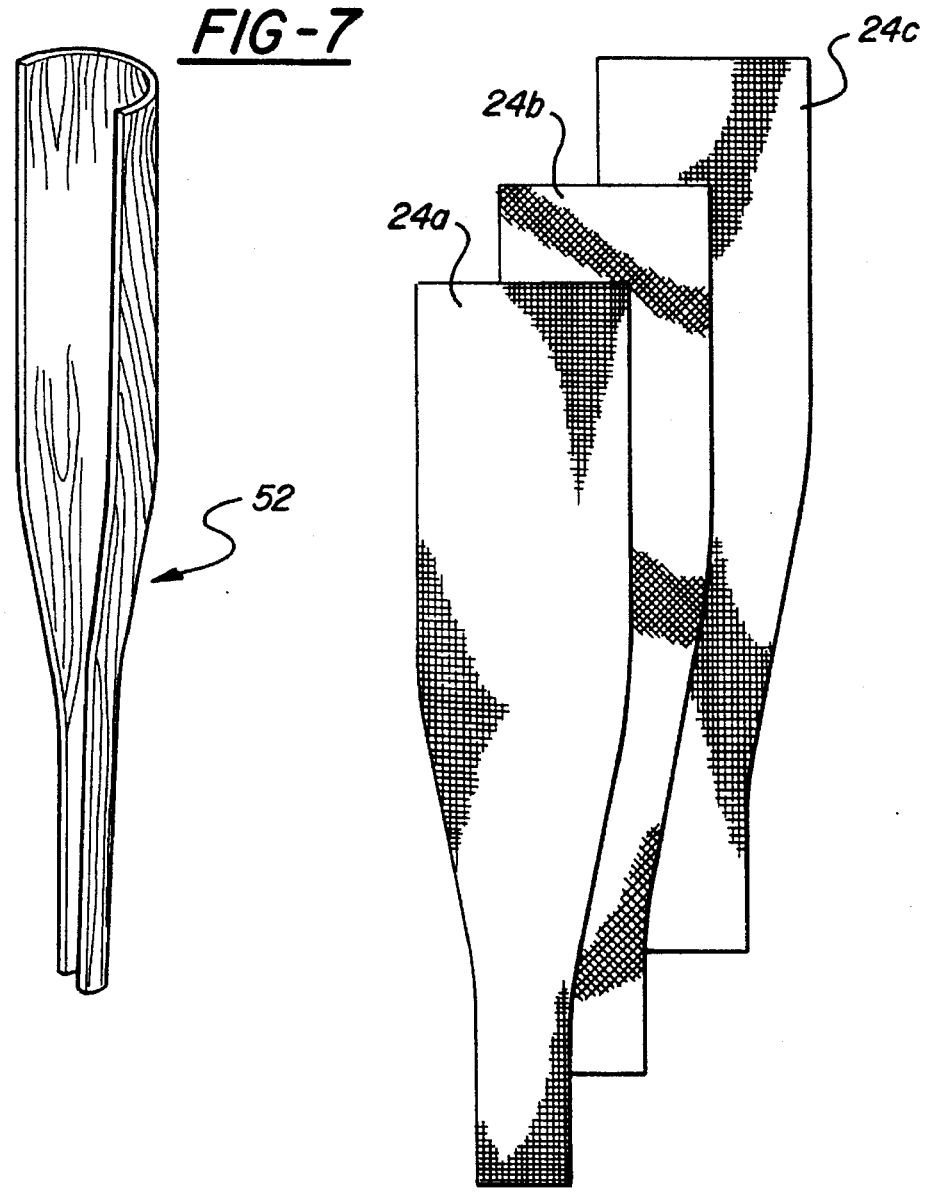
FIG-7
FIG-8
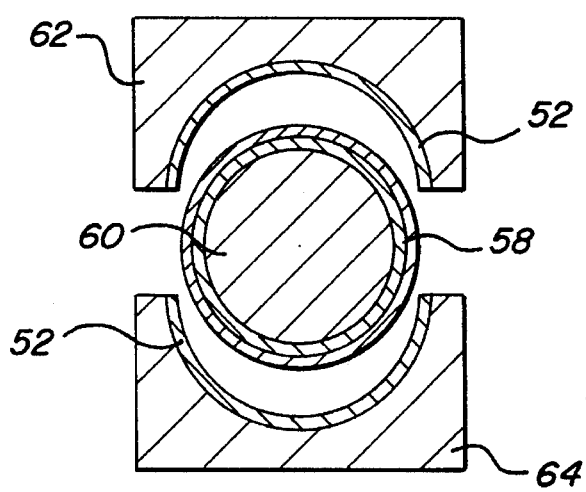
FIG-10

COMPOSITE BASEBALL BAT WITH CAVITIED CORE

RELATED APPLICATIONS

This application is a divisional of U.S. Ser. No. 08/262,432, filed Jun. 20, 1994, now U.S. Pat. No. 5,458,330, which is a continuation-in-part of U.S. Ser. No. 137,694, filed Oct. 15, 1993 and now U.S. Pat. No. 5,460,369, which is, in turn, a continuation of U.S. Ser. No. 883,263, filed. May 14, 1992, abandoned, which is, in turn, a continuation-in-part of Ser. No. 518,782, filed May 4, 1990, and now U.S. Pat. No. 5,114,144.

FIELD OF THE INVENTION

This invention relates to baseball bats or the like comprising a cylindrical tube of wood veneer overlying a fiber reinforced resin layer and a central core, with the resin impregnating and bonding the three together, and to methods of forming such devices.

BACKGROUND OF THE INVENTION

My U.S. patent application Ser. No. 518,782 (now U.S. Pat. No. 5,114,144) discloses a baseball bat or the like formed of a tube having an outer layer of wood veneer overlying an inner layer of fiber reinforced resin, with the two layers being impregnated with and bonded together with cured resin. Such bats have the desirable aesthetic appearance of solid wood bats, are much less susceptible to breakage in use than solid wood bats and can be designed to emulate the performance of either solid wood bats or exceed the performance of the livelier aluminum bats with larger sweet-spots. The present invention is directed toward improved versions of such bats and to methods of making the bats.

SUMMARY OF THE INVENTION

The present invention is directed to articles such as bats, drum sticks, billy clubs, cricket bats, field hockey sticks, furniture legs or the like, formed of cylindrical tubes. The preferred embodiment of the present invention takes the form of a baseball bat which tapers from a relatively narrow handle section into a larger diameter, bulbous, barrel section. The outer layer of the bat consists of one or more strips or sheets of wood or wood-like veneer. A single veneer sheet may be employed, in which case the grain of the sheet is preferably arrayed parallel to the longitudinal axis of the bat. If a plurality of veneer sheets are used their grains are preferably crossed relative to one another. Alternatively, strips of veneer may be wound around in spiral fashion to cover the bat.

In a preferred embodiment, the veneer layer is formed by cutting a pair of longitudinally extending sections of appropriately varying width, optionally imprinting at least one of the sections with a logo, and pre-shaping the sections the into semi-cylindrical configuration by soaking them with solvent and then shaping them in dies while a solvent is driven off by heat.

The veneer layer formed of these two preshaped sections overlies and is adhered to a tubular layer formed of multiple sheets of resin-reinforced, high tensile strength fiber fabric such as glass, carbon, ceramic or Kevlar®. The fiber orientations of the multiple layers are angled relative to one another. The fiber sheets may be knitted, woven or otherwise formed and are preferably formed as a tubular sock by edge seaming two longitudinally aligned sections. A pair of the socks, with their seams displaced by 90° relative to one another are arrayed over a shaped form which may either constitute a mandril to be later removed or a permanent foam core for the bat. The fiber fabric is then coated with resin in liquid form, or preimpregnated fabric may be used, and the two veneer sections are positioned over the fabric. The resin is then cured while the veneer is pressed against the fiber layer either by means of a vacuum bag or matched dies. In one embodiment of the invention, employing a removal mandrel as a form, curing is accelerated by heating the formed composite at a suitable curing temperature for the resin. When the composite is formed over the foam plastic core, the curing temperature must be limited to prevent damage to the core.

After curing over a mandrel, the mandrel is removed, a preformed knob end is fitted over the open handle end of the tube, a preformed fiberglass cap is fitted over the barrel end, and both are adhered to the tube with resin. In one embodiment of the invention, a self-foaming plastic resin compound, preferably a urethane, is injected into the tube through a small hole in one of the bat ends. The two components of the resin react within the tube, filling the tube with a foamed core. The foamed in core may be partially hollowed out to form a core having a central cavity. The central cavity may be left hollow, or may be fitted with a second type of foam of a different (lower) density. Preferably, the volume of urethane components injected is varied along the length of the tube to create a higher density foam at the barrel end than at the handle end, shifting the center of gravity of the bat toward the barrel end.

Alternatively, the tube may be closed off at the handle end and the barrel end without filling it with foam to provide a hollow bat. When the resin impregnated outer tubes are cured directly over a foamed core, the handle end is fitted with a preformed knob and the barrel end with a preformed cap.

Alternatively, the core may be first molded in a suitable mold and covered with the fiber fabric sock and liquid resin prior to attachment of the veneer layer. The core may be formed with a molded-in (or otherwise formed, such as by hollowing out) central cavity, either empty or filed with a lower density material. Preferably, the central cavity radially extends from the longitudinal axis of the bat and extends longitudinally along at least a portion of the bat. The barrel of this embodiment of the bat may be made relatively larger with respect to the handle.

In the embodiments of the bat with foamed cores, the density of the foam is limited so that when the bat impacts a pitched ball, the tubular outer layers deform inwardly, locally compacting the core. The same localized deformation occurs with a hollow core bat formed in accordance with the present invention, but the hollow core bat also undergoes a larger hoop, radial distortion. The embodiment including the core with the central cavity undergoes a combination of local spring deformation and hoop, radial deformation. By adjusting the size of the central cavity, selecting the material of which the core is formed, and choosing whether or not to fill the central cavity with another material, the relative amounts of the two types of deformation may be changed, resulting in different performance characteristics. Thus, the bats of the present invention may be made to completely simulate the performance of a solid wood bat (which undergoes virtually no local deformation) or, alternatively, exceed the performance of the livelier aluminum bats with their larger sweet spots.

Other objectives, advantages and applications of the present invention will be made apparent by the following description of several preferred embodiments of the invention.

BRIEF DESCRIPTION OF THE DRAWINGS

The description makes reference to the accompanying drawings in which:

FIG. 1 is a perspective, exploded, partially broken-away view of a bat, representing a preferred embodiment of the present invention;

FIG. 2 is a sectional view through the bat of FIG. 1 taken along line 2—2 of FIG. 1;

FIG. 3 is a sectional view through an alternative embodiment of the bat having a hollow core;

FIG. 4 is a partial, longitudinal cross-sectional view through the knob end of the bat of FIGS. 1 and 2, illustrating the knob end cap;

FIG. 5 is a partial longitudinal cross-sectional view through the barrel end of the bat of FIGS. 1 and 2 illustrating the barrel end;

FIG. 6 is a side view of a section of wood veneer, cut to form one of the two sections used to cover the outer surface of the bat of the preferred invention and imprinted with the logo required on the finished bat;

FIG. 7 is a perspective view of a veneer section after it has been preshaped for use in forming the bat of the present invention;

FIG. 8 is a view of multiple ply, knitted high tensile fiber fabric sheets cut to form a sock for use in forming the bat of the present invention;

FIG. 10 is a sectional view through a resin-impregnated tube of wood veneer overlying a fiber sock, within the female dies used to form bats of the present invention;

DETAILED DESCRIPTION OF THE PREFERRED EMBODIMENT

Figure 9:
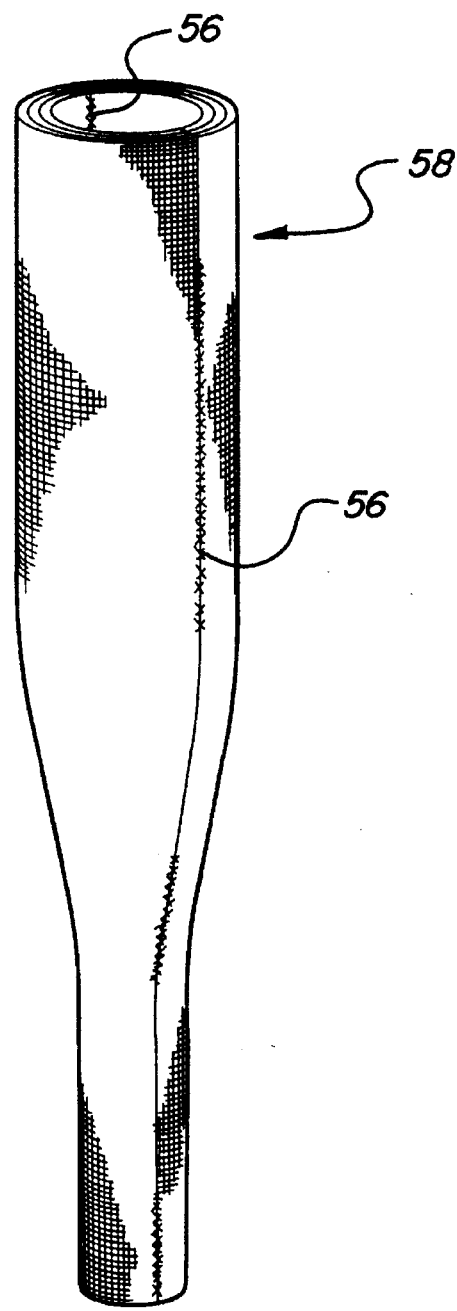
FIG. 9 is a perspective view of a multi-ply, high tensile fiber fabric sock formed by sewing together two stacks of cut fabric sheets, for use in forming the bat of the present invention.

While the present invention is not limited to baseball bats, and extends to similar articles such as drum sticks, billy clubs, cricket bats, field hockey sticks, furniture legs and the like, a bat constituting a preferred embodiment of the invention is illustrated in FIGS. 1 and 2. The bat, generally indicated at 10 in exploded form, consists of a tube 12, a handle knob generally indicated at 14 and a barrel cap generally indicated at 16. The tube 12 has an outer configuration and dimensions like those of conventional prior art bats which are formed of solid wood, aluminum tubing, or fibre reinforced resin. The bat is radially symmetrical about a centerline, and tapers from a relatively narrow handle end 18 to a larger diameter, bulbous, barrel end 20.

The outer surface of the bat is covered by a structural sheath of wood or wood-like veneer 22 coated and impregnated with a cured epoxy resin. The outer veneer sheath 22 covers the entire tube 12. In a preferred embodiment of the invention the outer sheath 22 is formed of two longitudinally array strips or "planks" of white ash veneer of approximately ⅛ to 1/16 inch thickness. The term "plank" is used because the strips vary in width longitudinally so that when they are laid in side-by-side abutment with one another they form the outer contour of the bat without overlap. The strips are preferably laid with their grains extending longitudinally along the length of the bat to provide maximum longitudinal tensile strength and impact resistance. In alternative embodiments, each plank may be formed of a plurality of thinner sheets of wood veneer with their grains preferably arranged at angles to one another. In yet other embodiments, the sheath may be formed of thin strips of veneer which are spirally wound onto, or otherwise applied to, the bat.

The veneer outer surface 22 overlays a fabric layer of high tensile strength, resin impregnated, fabric socks 24a, 24b. Only two socks are shown for purpose of illustration although a greater or lesser number of sheets may be used in alternative embodiments of the invention. The fabric layer surrounds a core 28 formed of a resilient urethane foam, wood, aluminum, or the like. As will be subsequently described in detail, the core may vary in density over the length of the bat, preferably with a higher density section adjacent the barrel end 20 to shift the center of gravity of the bat toward the barrel end and improve the impact strength of the barrel.

The handle end of the bat, illustrated in detail in FIG. 4, is closed off by the knob 14 which includes an extending cylindrical section 30 which is of the same outer diameter as the handle end 18 and abuts the termination of the wood veneer sheath 22. The knob end 14 may be formed of plastic, solid wood or a combination thereof, and may be integral with the rest of the bat 10 by molding in a process which will be subsequently described.

Similarly, as illustrated in detail in FIG. 5, the barrel end of the tube 20 is terminated by the cap 16, preferably formed of fiber reinforced resin, which has a rounded end 32 and a tubular section 34 with an outer diameter which mates with the inner diameter of the fiber sections and is adhered thereto by resin. This end can also be formed in the mold with the bat.

Alternatively, the bat may be formed with a hollow core rather than a solid core 28. A cross-sectional view of this alternative embodiment of the invention is illustrated in FIG. 3, generally at 40. The hollow core bat may otherwise be substantially identical to the solid core bat, although to achieve the same weighing, it is necessary to use heavier cloth socks 24a,24b. A hollow aluminum core could also underlie the resin impregnated fabric layer.

One of the planks of wood veneer suitable in forming the bat of the present invention is illustrated in FIG. 6. The veneer sheet 42 is out from flat veneer stock by laser cutting, die cutting, router cutting, or like process so as to have the appropriate contour to cover half of a completed bat. The veneer section 42 includes a narrow, longitudinally extending handle section 44, a relatively wide barrel covering section 46 and a tapered section 48, joining the two. One of the two veneer sheets used to form the outer layer of the bat is preferably preprinted with a logo 50 while it is flat. The logo is preferably imprinted with an epoxy ink by a silk-screen process, or branded by burning.

In the production of the bat, the plank 42 is preshaped into a semi-cylindrical configuration to create a preform generally indicated at 52 in FIG. 7. To achieve this preform shape, the plank 42 is saturated with a liquid solvent such as water, alcohol or the like, is then shaped into the semi-cylindrical form in either matched dies or one die using a vacuum bag to pressure the plank 42 against the die, and the plank is heated to drive off the solvent. This process stretches the cellulose fibers of the veneer to achieve the semi-cylindrical shape 52. In alternative embodiments of the invention this preshaping step may be eliminated and the flat plank 42 may be shaped over the inner fabric layers as part of the same process that bonds the outer layer to the inner fabric.

The fabric socks 24 are preferably formed by stacking several sheets of fabric and cutting them into plank shape. A stack of three such "fabric planks" 54a,54b,54c are illustrated in FIG. 8. Any number of sheets may be employed, but the preferred embodiment utilized stacks of four sheets. These fabric sheets may be woven or knitted or formed by other process, such as by filament winding or poultrusion over the core or mandrel.

By appropriate choice of the nature of the layers, the stiffness, strength, flexibility and elasticity of the final bat may be controlled. The preferred composition creates a bat with such properties that when the ball impacts the bat during the batter's swing the bat undergoes a localized deformation conforming to the contact area of the baseball, as well as radial or hoop deformation (the cylindrical bat temporarily deforms into an ovoid when viewed in cross section). It is important that foam core 28 be sufficiently resilient to allow this dual deformation which aids in the transfer of the kinetic energy of the swinging bat to the baseball. In the hollow core embodiment of the bat, illustrated in FIG. 3, the outer tube of the bat also elastically deforms to produce oval distortion of the overall cylindrical configuration of the bat as well as the more localized deformation conforming to the contact area of the ball.

Figure 12:
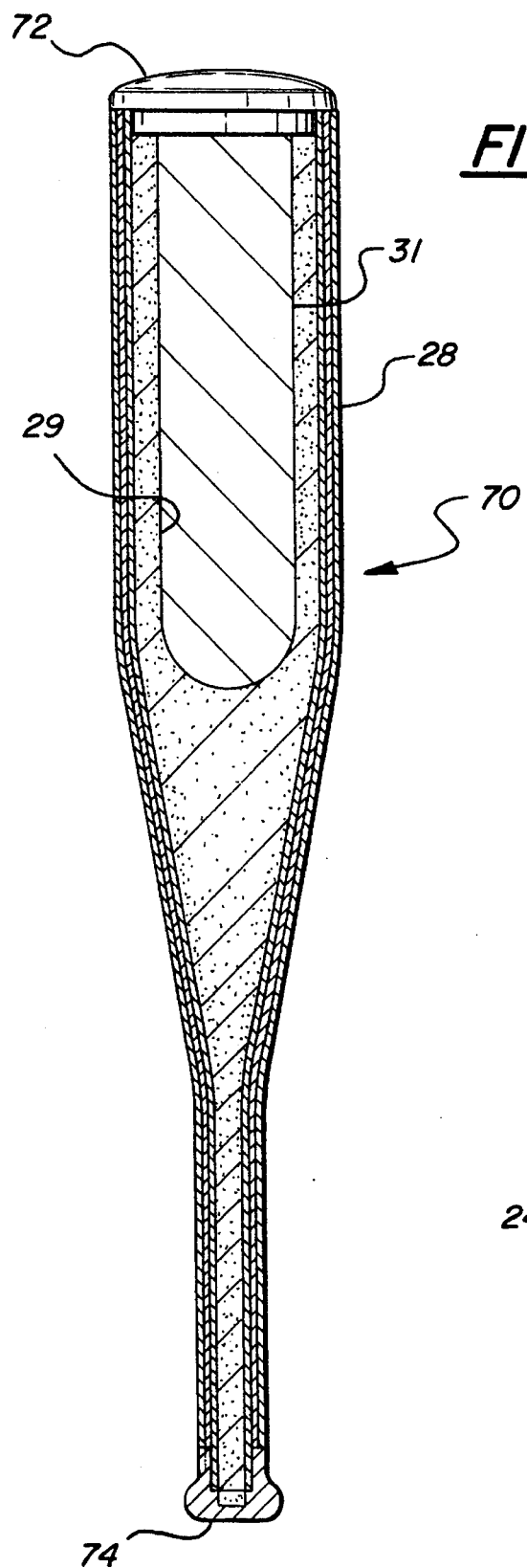
FIG. 12 is a sectional view through another embodiment of the bat having a core with a central cavity.
Figure 13:
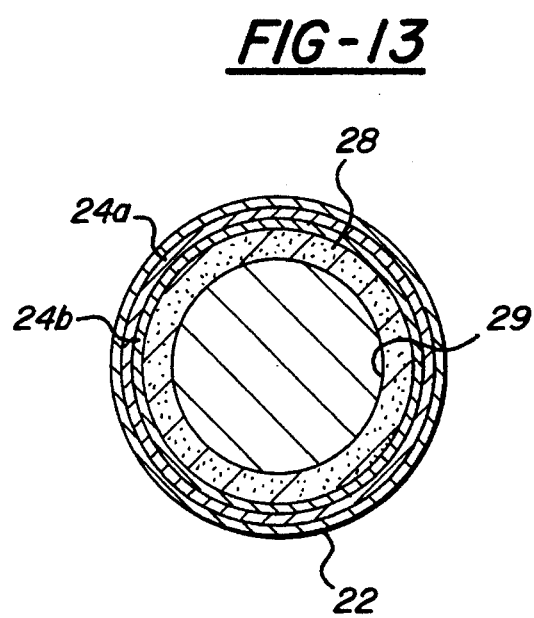
FIG. 13 is a sectional view through the bat of FIG. 12 taken along lines 13—13 of FIG. 12.

In the embodiment 70 of the present invention shown in FIGS. 12 and 13, the core 28 is formed with a central cavity 29 which extends radially from the longitudinal axis of the bat and longitudinally along a portion of the length of the bat. The cavity 29 roughly underlies the "sweet spot" area of the bat. It has the effect of increasing the hoop spring and decreasing the local spring; i.e., bat 70 tends to deform more radially (into an oval) and less locally (thus producing the increased trampoline effect) than bat 10. By adjusting the size and shape of the cavity 29, bat 70 may be designed for maximum energy transfer to the ball it hits. Furthermore, the cavity 29 may be fitted or partially filled with a plug 31 formed of a different and generally less dense material to produce a composite core. Adjustment of the configuration of the cavity 29 also allows more effective matching of the veneer, fiber fabric and core density and resiliency.

The embodiment shown in FIGS. 12 and 13 may be made so that the barrel 72 is relatively larger than the handle 74 than is the case in conventional bats, without unduly increasing the weight of the bat. A bat of such design may be particularly useful in youth or training environments. Similar designs may also be employed in other products where balance and "natural feel" are important.

After two stacks of plank shaped fiber sheets of the type illustrated in FIG. 8 are created they are preferably sewn together along their longitudinal edges, preferably using a zig-zag seamer or a butt-seamer along two lines 56, to form a cylindrical sock 24, generally illustrated in FIG. 9.

One alternate method of forming the bat, this sock 24 is arrayed over an appropriately shaped aluminum mandrel 60 which has been precoated with a mold release compound. A second sock is then arrayed over the first sock with its seams displaced by 90° relative to the seams of the first sock. Alternatively, the core may be preformed of foam or aluminum, and the socks directly arrayed over the pre-formed core, thus eliminating use of the mandrel.

In preferred embodiment of the present invention, the fabric sock which directly overlies the mandrel 60 employs inner layers formed of DuPont Kevlar®, or S-2 glass fiber and three overlying layers of graphite fiber. The Kevlar® layer is preferably aligned with its fibers parallel to the longitudinal axis of the bat. The first graphite layer has its fibers arrayed circumferentially, at 90° to the first layer, the third and fourth layers have their fibers arrayed at 45° to the fibers of the first two layers. The Kevlar® fabric is preferably K-49 type weighing 11.6 ozs. per square yard and is 2160 denier, 41 ends per inch. The three graphite layers are of type 6KT300 weighing 5.5 ozs. per square yard and having 12.0 ends per inch. The four layers are preferably knitted together with a thin sheet of polyester film which is marked with the required plank pattern. These five layers are then cut together to form a plank.

A second sock is preferably formed of similar materials, but with a layer of fiber glass weighing 1 oz. per square foot, with its fibers arrayed circumferentially, overlying the outermost glass layer. The socks are sewn using Kevlar® K-49 thread with 12 needles per inch.

A pair of preshaped wood veneer planks 52 are then arrayed in matched female molds 62 and 64. The interior surfaces of the veneer preforms 52 are preferably coated with the liquid epoxy. The exterior, convex surfaces of the preforms 52 may or may not be coated with epoxy before their insertion in the mold 62,64. The fabric socks 24 are also thoroughly impregnated with the liquid resin, and the molds are then closed over the sock coated mandrel 60 or the pre-formed core, and the dies heated to thoroughly cure the resin. The resin used preferably has a curing temperature in the vicinity of 300° F. The preferred resin composition is Reichold 37127 epoxy. The resin may incorporate various additives such as natural rubber to improve the resiliency of the finished bat.

After the resin is cured, the assembly of the wood veneer preforms 52 and the sock 24 are removed from the molds 62,64, and the mandrel 60, if employed, is removed from the barrel end of the tube. To form a hollow core bat, this tubular section may be finished by capping the handle end with cap 14, joining the two by epoxy resin, and finishing the barrel end by the cap 16, similarly adhered to the tube by epoxy resin. Alternatively, the caps 14 and 16 may be formed in the two part, matched female molds 62,64 with the other components, the molds including forms for molding the knob cap 14 and the end cap 16.

Figure 11:
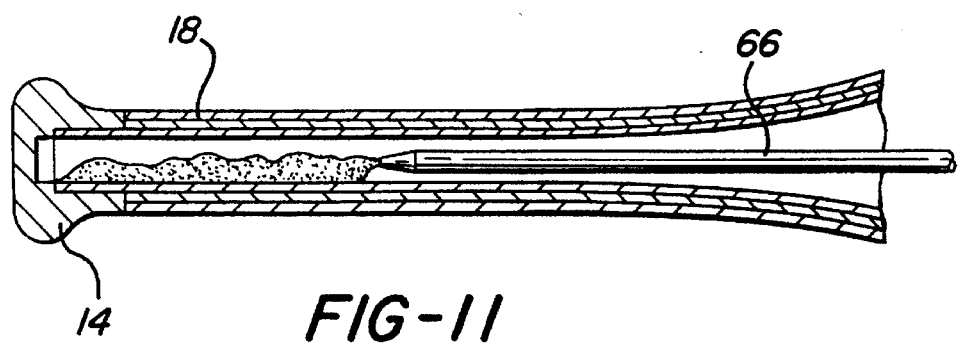
FIG. 11 is a sectional view of a cured bat tube formed in accordance with the present invention, with a knob fitted at the handle end, in the process of having self-foaming, liquid resin components being injected into the tube to form a foam plastic core by a foam-in-place technique.

To form the embodiment of the bat with its foam core 28 shown in FIGS. 1 and 2, the handle end of the bat may first be finished with the cap 14, as illustrated in FIG. 11, and the components of a self-foaming resin injected into the preform through a tube 66 inserted through a small central hole in the open barrel end cap 16 which is later closed. In this method, the core is preferably a self-foaming urethane. Sufficient resin is injected to achieve a core density which may be in the range of 10–30 pounds per cubic foot. The quantity of liquid resin injected along the length of the tube may be adjusted to achieve a varying density foam. Preferably, the density of the foam at the barrel end is relatively high compared to the density adjacent the handle end to achieve a desirable end weighting.

Alternatively, the bat may be formed by using a preformed core of urethane foam, aluminum, or the like, formed in female split dies, instead of the mandrel 60. For the embodiment shown in FIGS. 12 and 13, the pre-forming dies or molds may be designed so that the cavity 29 will be molded into the core. As previously mentioned, it may be partially or entirely filled with a less dense material. The cavity may also be formed by hollowing out matching portions of two molded halves of the core so as to form a cavity when the halves are joined. A weight of a high density material such as lead, may be imbedded in the barrel end of the core 60 to modify the weight distribution. The socks 24 are arrayed over the preformed core and impregnated with liquid resin, and the veneer preforms 52 are laid over the outer surface of the socks 24. The caps 14,16 are placed at the handle and barrel ends. The assembly is preferably cured in matched female molds. Alternatively, it could be cured in a vacuum bag placed within an autoclave. In this method of forming the bat, the curing temperatures for the resin can be limited to avoid damage to the foam core, limiting the strength of the finished bat and increasing the curing time.

Rather than forming the fabric layers in the form of socks which are placed over the mandrel, the fabric layers may be formed by filament winding techniques or by "pulltrusion" techniques known in the composite art.

Having thus described my invention, I claim:

1. A method of forming a baseball bat comprising:

forming a tube comprising an outer layer of wood veneer overlying an inner layer of fiber reinforced resin, the two layers being impregnated and adhered to one another by said resin;

curing said resin; and forming a self-forming plastic core within said tube by a foam in place method.

2. The method of claim 1 further comprising partially hollowing out the plastic core so as to form a central cavity therein extending from a barrel end of said tube and along the length of said tube for a distance.

3. The method of claim 1 in which said tube is formed over a mandrel and the resin is cured by heating to a temperature in excess of 150° F.

4. The method of forming a baseball bat having a relatively small diameter handle tapering to a relatively large diameter barrel, comprising:

overlaying a form with a contoured sock comprising a plurality of layers of fabric formed of the high tensile fibers, with various of the layers having their fibers at orientations angled relative to one another;

impregnating the fabric socks with liquid resin;

overlaying the socks with a sheet of wood veneer; and curing the resin.

5. The method of claim 4 in which resin is cured at an elevated temperature.

6. The method of claim 4 wherein said form constitutes a core.

7. The method of claim 6 further including partially hollowing out the core so as to form a central cavity therein extending from a barrel end of said tube and along the length of said tube for a distance.

8. The method of claim 7 further including filling said central cavity with a material which is less dense than the core.

9. The method of claim 7 further including forming a tubular knob end and attaching said knob end to the handle end of the bat by epoxy, 10. The method of claim 7 in which said veneer sheet is imprinted with a logo prior to attachment of the veneer sheet to the resin coated fiber, 11. The method of claim 7 in which said resin is cured while said bat or the like is pressured in a vacuum bag.

12. The method of claim 7 wherein said resin is cured while said bat is pressured in matched dies.

13. The method of claim 12 wherein a knob end is molded to the handle of said bat and a cap is molded to the barrel end of said bat in said matched dies.

14. The method of claim 4 in which said sock is formed form two elongated planks of stacks of sheets with their longitudinal edges sewn together.

15. The method of claim 14 including placing a second sock over said sock with the seams of said socks displaced relative to one another.

* * * * *

UNITED STATES PATENT AND TRADEMARK OFFICE
CERTIFICATE OF CORRECTION

PATENT NO. : 5,533,723
DATED : July 9, 1996
INVENTOR(S) : Charles S. Baum

It is certified that error appears in the above-indentified patent and that said Letters Patent is hereby corrected as shown below:

Column 4, line 56, delete "out" and insert --cut--.

Column 6, line 3, delete"preformed" and insert --pre-formed--.

Column 6, line 17, delete "6KT300" and insert --6K-T300--.

Column 8, line 21, delete "7" and insert --4--.

Column 8, line 25, delete "7" and insert --4--.

Column 8, line 28, delete "7" and insert --4--.

Column 8, line 30, delete "7" and insert --4--.

Signed and Sealed this

Twenty-ninth Day of April, 1997

Attest:

BRUCE LEHMAN

*Attesting Officer*   *Commissioner of Patents and Trademarks*